(12) United States Patent
Sawada

(10) Patent No.: US 7,249,501 B2
(45) Date of Patent: Jul. 31, 2007

(54) PRESSURE DISTRIBUTION MEASUREMENT SYSTEM

(75) Inventor: Jun Sawada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/315,268

(22) Filed: Dec. 23, 2005

(65) Prior Publication Data

US 2006/0156805 A1    Jul. 20, 2006

(30) Foreign Application Priority Data

Dec. 28, 2004    (JP)    ............................. 2004-380375

(51) Int. Cl.
*G01P 13/00*    (2006.01)
(52) U.S. Cl. .................... 73/170.02; 73/700
(58) Field of Classification Search .......... 73/700–756, 73/170.02

See application file for complete search history.

(56) References Cited

U.S. PATENT DOCUMENTS

| 5,163,328 A * | 11/1992 | Holland et al. ................ 73/717 |
| 5,969,591 A * | 10/1999 | Fung ............................ 338/42 |
| 6,719,222 B2 * | 4/2004 | Mebberson ................. 239/548 |
| 6,865,799 B2 * | 3/2005 | Hata et al. ................. 29/621.1 |
| 6,973,818 B2 * | 12/2005 | Silvis et al. ................ 73/1.06 |
| 7,178,394 B2 * | 2/2007 | Cochran ................. 73/170.02 |

FOREIGN PATENT DOCUMENTS

| JP | 62-35235 A | 2/1987 |
| JP | 2-2645 U | 1/1990 |
| JP | 10-274590 A | 10/1998 |

* cited by examiner

*Primary Examiner*—Edward Lefkowitz
*Assistant Examiner*—Jermaine Jenkins
(74) *Attorney, Agent, or Firm*—Birch, Stewart, Kolasch & Birch, LLP

(57) ABSTRACT

A pressure distribution measurement system for measuring a pressure distribution on a measurement object. A flexible sheet-form pressure detection member includes a plurality of pressure passages extending in parallel and a pressure detection hole opened in each of the pressure passages is affixed to a surface of an outer plate of a main wing W of an airplane. Each of the pressure passages is connected to a pressure measurement device via a pressure pipeline. Because the pressure detection hole is opened in the pressure detection member, that is, the pressure detection hole is not required to be opened in the outer plate of the main wing, the outer plate is not damaged. Further, because the flexible sheet-form pressure detection member conforms well to the three dimensionally curved surface of the outer plate and has a small thickness, the airflow is hardly disturbed at all, thereby enhancing pressure distribution measurement accuracy.

24 Claims, 5 Drawing Sheets

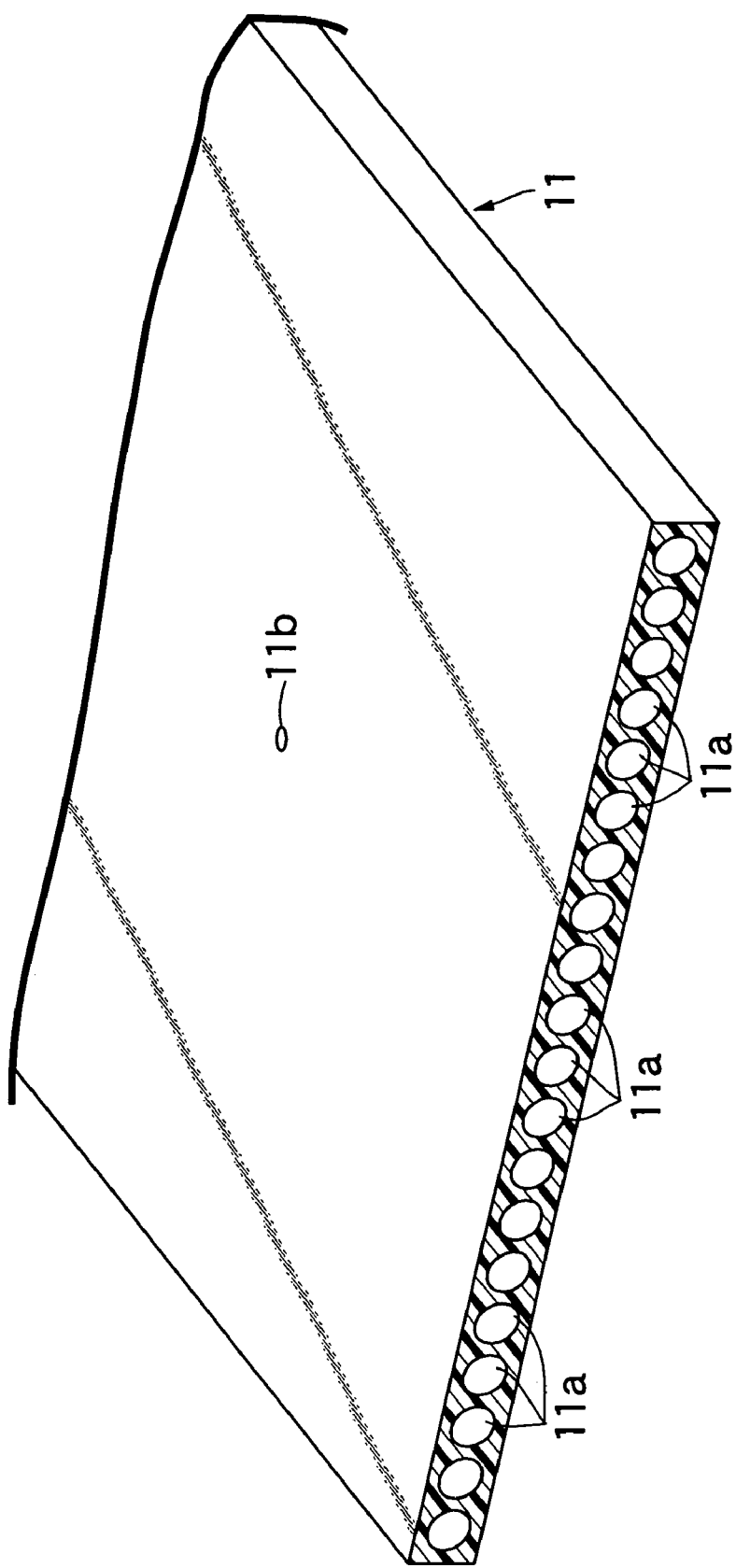

PRESSURE DISTRIBUTION MEASUREMENT SYSTEM

CROSS-REFERENCE TO RELATED APPLICATION

The present application claims priority under 35 USC 119 to Japanese Patent Application No. 2004-380375 filed on Dec. 28, 2004 the entire contents of which are hereby incorporated by reference.

BACKGROUND OF THE INVENTION

1. Field of the Invention

The present invention relates to a pressure distribution measurement system for measuring a pressure distribution on a surface of a measurement object which moves relative to a fluid.

2. Description of the Related Art

Japanese Patent Application Laid-open No. 10-274590 discloses an arrangement in which a plurality of pressure detection holes open, at predetermined intervals in the chord direction, in the surface of a wing model for measuring a pressure distribution by a wind tunnel test. Pressure pipelines connected to the pressure detection holes are connected to a pressure measurement device through the interior of the wing model.

Further, Japanese Utility Model Registration Application Laid-open No. 2-2645 discloses an arrangement in which a large number of grooves that extend in the span direction are machined in the surface of a wing model for measuring a pressure distribution by a wind tunnel test. Wax is charged into the grooves and the surface of the wax is coated with silver powder and dried. A metal coating is formed on the silver powder by electroforming so as to cover openings of the grooves thereby forming a large number of pressure passages in the surface of the wing model. A pressure detection hole is opened in the metal coating so as to communicate with one end of each of the corresponding pressure passages with the other end of each of the pressure passages being connected to a pressure measurement device.

Furthermore, Japanese Patent Application Laid-open No. 62-35235 discloses an arrangement in which, in order to measure a pressure distribution on the surface of an automobile, among three laminated aluminum sheets, a middle sheet is cut out so as to form a plurality of pressure passages. Pressure detection holes communicating with the pressure passages are opened on one of the two end sheets sandwiching the middle sheet with open ends of the pressure passages being connected to a pressure measurement device.

However, in the arrangement disclosed in Japanese Patent Application Laid-open No. 10-274590, because it is necessary to open new pressure detection holes in the surface of the wing model when changing the positions of existing pressure detection holes, there is a problem that the wing model is damaged. Further, because the positions of the pressure pipelines within the wing model need to be changed accompanying the change in positions of the pressure detection holes, there is a problem that much labor is required for removing/installing and laying out the pressure pipelines.

Furthermore, in the arrangement disclosed in Japanese Utility Model Registration Application Laid-open No. 2-2645, not only the complicated machining of the pressure passage leads to a high cost, but also the arrangement is difficult to be applied to an actual airplane because the pressure passage greatly affects the thickness and the strength of an outer plate of the wing.

Moreover, in the arrangement disclosed in Japanese Patent Application Laid-open No. 62-35235, because the pressure distribution measurement sheet is formed by laminating three aluminum sheets, it is difficult to make the sheet conform to the three dimensionally curved surface of a measurement object, and there is a possibility that creases generated in the sheet disturbs airflow to deteriorate the measurement accuracy.

SUMMARY OF THE INVENTION

The present invention has been accomplished under the above-mentioned circumstances, and an embodiment has an object to easily and accurately measure a pressure distribution on a surface of a measurement object without damaging the measurement object.

In order to achieve the above object, according to a first feature of the present invention, there is provided a pressure distribution measurement system for measuring a pressure distribution on a surface of a measurement object that moves relative to a fluid. The system includes a flexible sheet-form pressure detection member fixed to the surface of the measurement object, the pressure detection member having a plurality of pressure passages extending in parallel, and a pressure detection hole opened in each of the pressure passages. A pressure measurement device is provided wherein each of the pressure passages is connected to the pressure measurement device via a pressure pipeline.

With the first feature of the present invention, the flexible sheet-form pressure detection member having the pressure detection hole opened in each of the plurality of pressure passages extending in parallel is fixed to the surface of the measurement object, and each of the pressure passages is connected to the pressure measurement device via the pressure pipeline. Therefore, the pressure on the surface of the measurement object can be transmitted to the pressure measurement device via the pressure detection hole, the pressure passage, and the pressure pipeline, thus measuring a pressure distribution. Because the pressure detection hole is opened in the pressure detection member, that is, the pressure detection hole is not required to be opened in the measurement object, the measurement object is not damaged. Further, because the flexible sheet-form pressure detection member conforms well to the three dimensionally curved surface of the measurement object and has a small thickness, the airflow is hardly disturbed at all, thereby enhancing pressure distribution measurement accuracy.

Further, since the pressure detection member having the plurality of pressure passages is only fixed to the surface of the measurement object by bonding, etc., the operation is simple and it is easy to change the measurement site. Furthermore, since the pressure pipelines can be connected to any position of the plurality of pressure passages, the pressure pipelines can be connected to the pressure passages at positions in proximity to each other, so that the plurality of pressure pipelines can be brought together. This not only minimizes the number of openings running through the surface of the measurement object, but also easily secures space for laying out the plurality of pressure pipelines within the measurement object.

According to a second feature of the present invention, in addition to the arrangement of the first feature, the pressure detection member is extrusion-molded from a synthetic resin.

With the second feature of the present invention, since the pressure detection member is extrusion-molded from a synthetic resin, the production cost can be reduced to a very low level.

A main wing W of an embodiment corresponds to the measurement object of the present invention.

The above-mentioned object, other objects, characteristics, and advantages of the present invention will become apparent from a preferred embodiment that will be described in detail below by reference to the attached drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a perspective view of the pressure detection member.

DESCRIPTION OF PREFERRED EMBODIMENT

Figure 1:
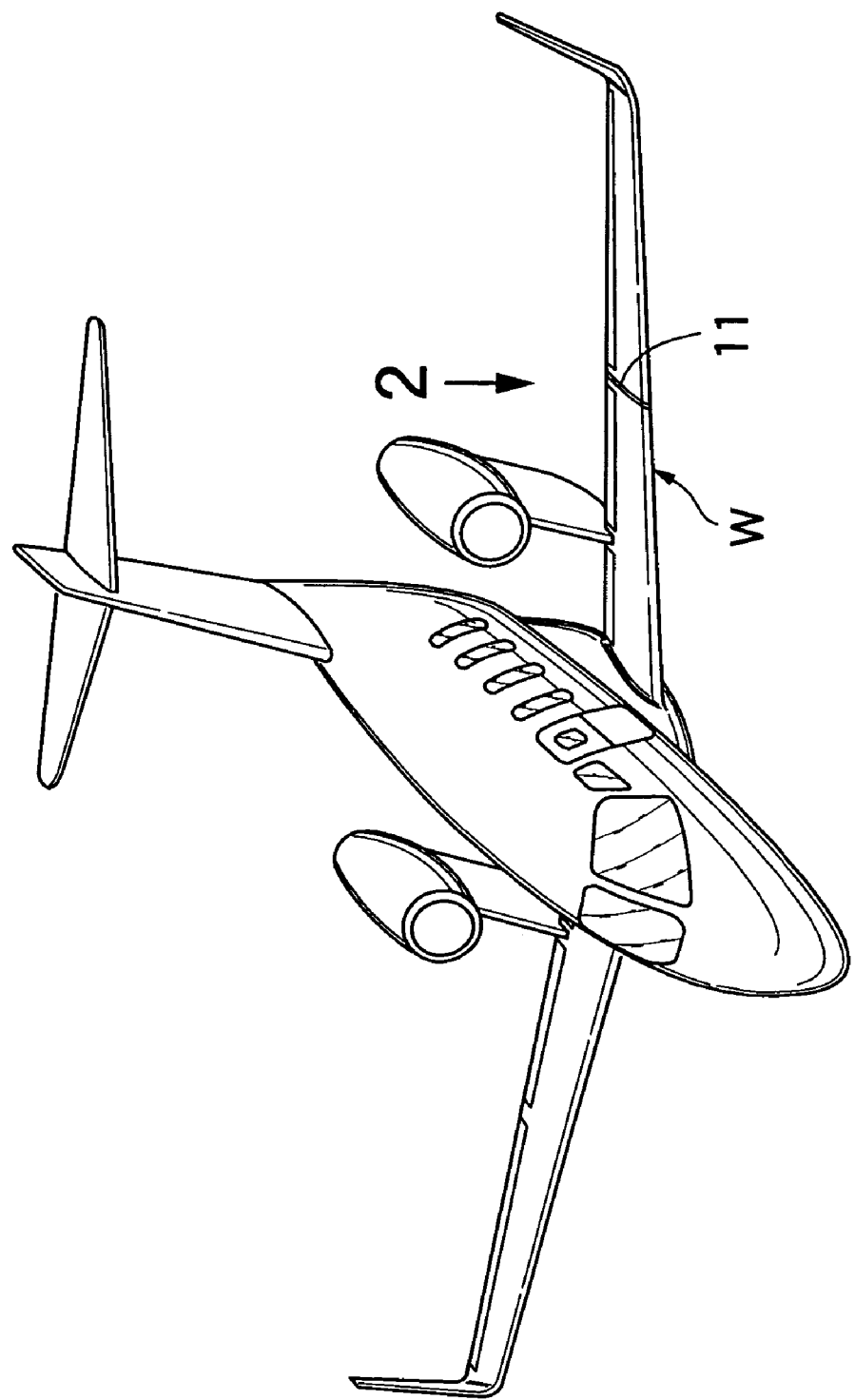
FIG. 1 is a perspective view of an airplane having a pressure detection member mounted on the surface of a main wing.
Figure 2:
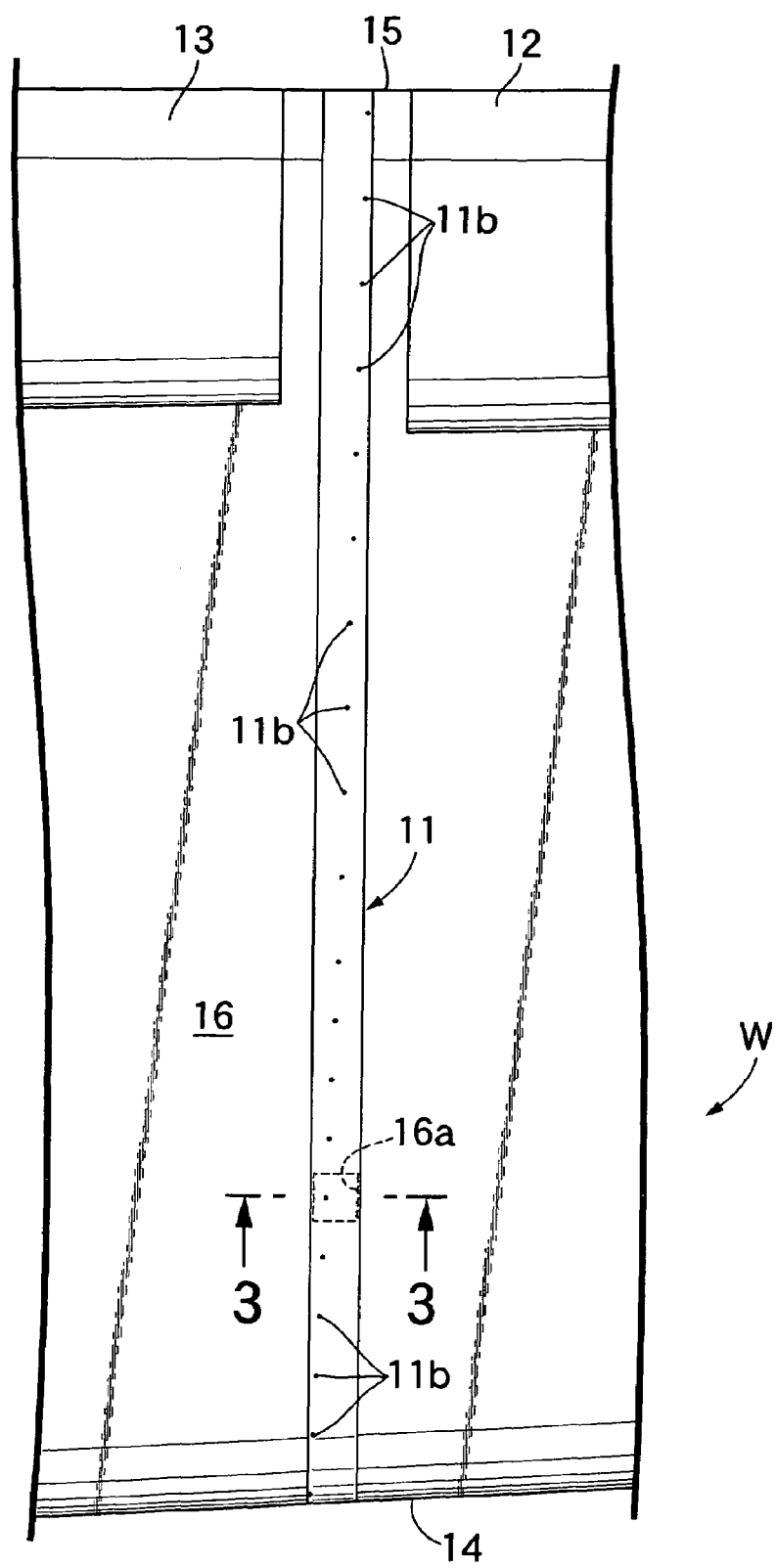
FIG. 2 is an enlarged view taken from arrow 2 in FIG. 1.

As shown in FIG. 1 and FIG. 2, in order to measure a pressure distribution in the chord direction on an upper face of a main wing W of an airplane, a pressure detection member 11, which is a narrow long band-shaped sheet, is detachably mounted by means of, for example, an adhesive. The pressure detection member 11 extends from a front edge 14 to a rear edge 15 along a chord line of the main wing W at a position that avoids an aileron 12 and a flap 13.

As is clear from FIG. 5, the pressure detection member 11 is a thin sheet-form member extrusion-molded from a synthetic resin so as to have a thickness of about 1 mm. A plurality of pressure passages 11a extend in parallel through the interior of the pressure detection member 11. When used, openings at opposite ends of the pressure passages 11a are hermetically closed by heat welding, etc., and during this process front and rear edges of the pressure detection member 11 are flattened to make them thin, thus minimizing the influence on the airflow.

Figure 4:
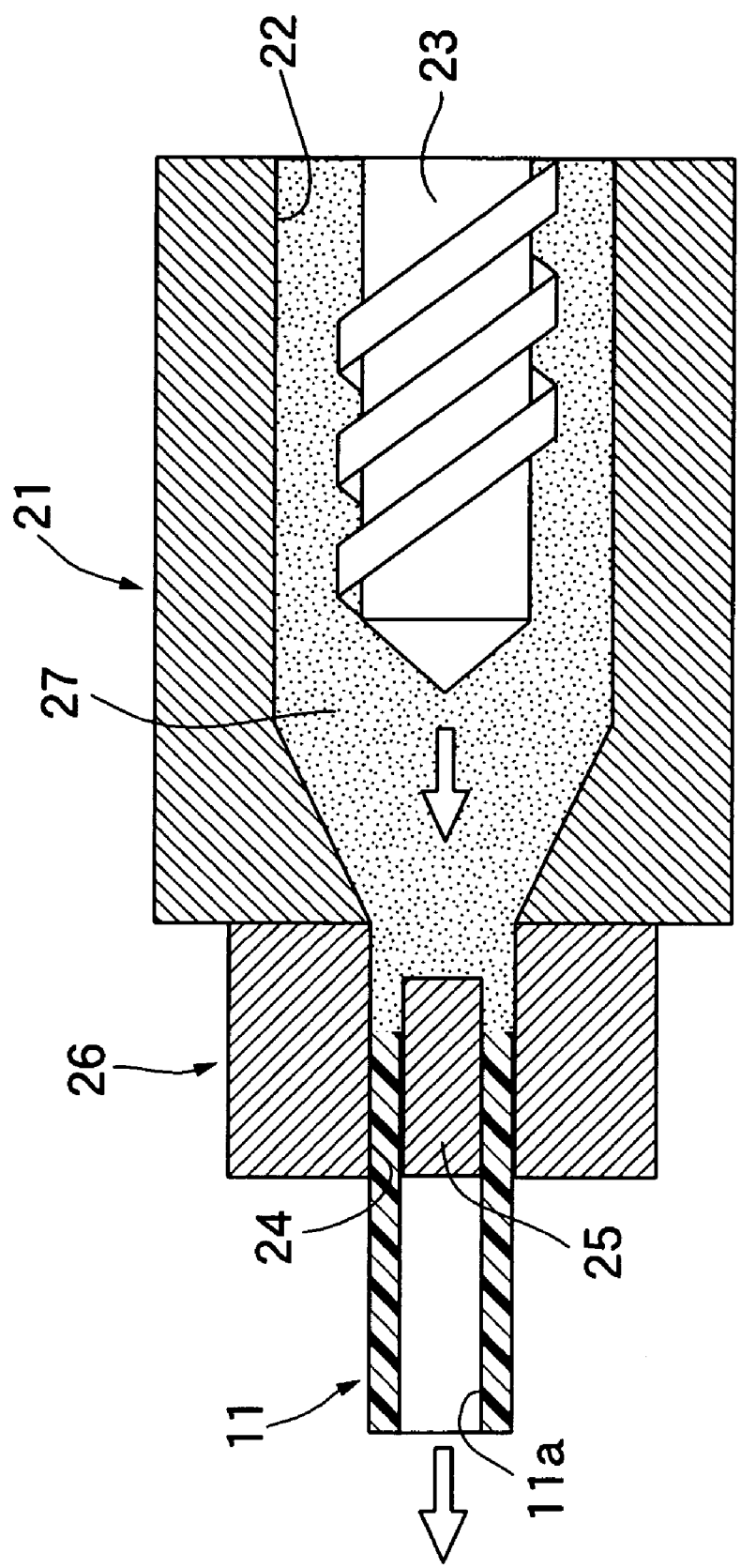
FIG. 4 is a sectional view of an extrusion-molding machine for the pressure detection member.

As shown in FIG. 4, an extrusion-molding machine 21 includes a screw 23 within a hollow resin passage 22, the screw 23 being rotated by a driving source (not illustrated). A die 26 having an extrusion passage 24 and cores 25 is mounted on an outlet opening of the resin passage 22 positioned forward of the screw 23. Molten resin 27 within the resin passage 22 is supplied by the screw 23 to the die 26, and when it passes through a space surrounded by the extrusion passage 24 and the cores 25, it is molded into the shape of the pressure detection member 11 shown in FIG. 5. By employing extrusion molding in this way, the pressure detection member 11 integrally having the plurality of pressure passages 11a can be produced at a low cost.

As shown in FIG. 2 and FIG. 5, pressure detection holes 11b spaced at predetermined intervals in the fore-and-aft direction are opened in the pressure passages of the pressure detection member 11. Although the intervals between the pressure detection holes 11b can be freely determined, it is desirable to set small intervals in a section closer to the front edge 14 in which the rate of change in pressure distribution in the chord direction of the main wing W is large, and to set large intervals in a section closer to the rear edge 15 in which the rate of change in pressure distribution is small. Because only one pressure detection hole 11b is provided in each of the pressure passages 11a, a line joining together the adjacent pressure detection holes 11b is slightly inclined relative to the chord direction of the main wing W. However, because the entire width of the pressure detection member 11 is much smaller than the chord length of the main wing W, the influence of such an inclination can be ignored. If it is necessary to make the line joining together the pressure detection holes 11b exactly coincide with the chord direction of the main wing W, the pressure detection member 11 is mounted on the main wing W so that the longitudinal direction of the pressure detection member 11 is inclined with respect to the chord direction of the main wing W.

Figure 3:
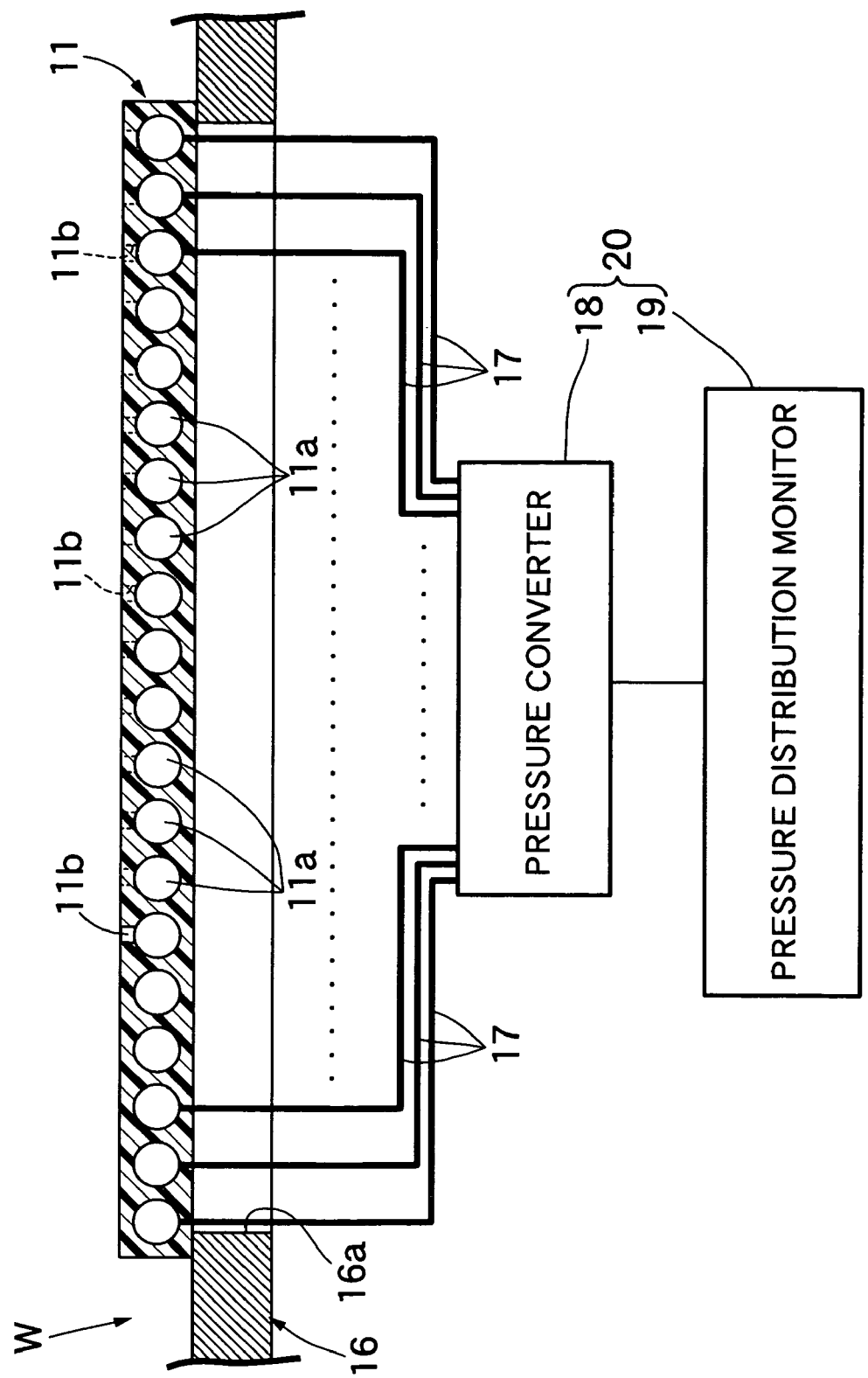
FIG. 3 is an enlarged sectional view taken along line 3—3 in FIG. 2.

As shown in FIG. 2 and FIG. 3, the pressure detection member 11 is affixed to an outer plate 16 of the main wing W so as to cover an opening 16a formed therein. Pressure pipelines 17, which are flexible synthetic resin pipes, are respectively connected to the pressure passages 11a of the pressure detection member 11 at positions facing the opening 16a. These pressure pipelines 17 are bundled together and extend within the main wing W into a fuselage where they are connected to a pressure measurement device 20 comprising a pressure converter 18 and a pressure distribution monitor 19. If a maintenance opening, etc., which is already provided in the outer plate 16 is used as the opening 16a of the outer plate 16 through which the pressure pipelines 17 run, it is unnecessary to form a special opening in the outer plate 16 for measurement of a pressure distribution, so that the main wing W is not damaged.

When there is an airflow along the surface of the main wing W of an airplane during flight, a certain pressure distribution is formed along a chord line of the wing W. Part of the airflow flows along the surface of the pressure detection member 11 affixed to the outer plate 16 of the main wing W, and the pressure of the pressure detection hole 11b opened in each of the pressure passages 11a changes according to the flow rate of air flowing thereabove. The pressures of the pressure detection holes 11b are transmitted to the pressure measurement device 20 via the corresponding pressure passages 11a and the pressure pipelines 17 within the main wing W, converted into numeric values by the pressure converter 18, and displayed on the pressure distribution monitor 19.

As described above, because the thin sheet-form pressure detection member 11, in which the plurality of pressure passages 11a having the pressure detection holes 11b opened at the predetermined positions are arranged in parallel to each other, is affixed to the surface of the outer plate 16 of the main wing W by means of an adhesive, etc., it is unnecessary to form pressure detection holes directly in the outer plate 16 of the main wing W, and thus a pressure distribution can be measured without damaging the outer plate 16 and without the cumbersome operation of forming a large number of pressure detection holes in the outer plate 16. Moreover, in order to change the pressure distribution measurement site, the unwanted pressure detection member 11 is peeled off and a new pressure detection member 11 is affixed, thus remarkably simplifying the operation.

Further, because the pressure detection member 11 is formed from a sheet that is much thinner than the outer plate of the main wing W, the influence on the airflow is almost negligible. Furthermore, because the pressure detection member 11 is made of a flexible synthetic resin, it can stretch so as to conform to the three dimensional curvature, thus preventing generation of creases, further suppressing the influence on the airflow, and enhancing the measurement accuracy. Moreover, because the pressure pipelines 17 can be connected at any position in the longitudinal direction of the pressure passages 11a of the pressure detection member 11, the plurality of pressure pipelines 17 can be connected and bundled together at positions where the pressure passages 11a are close to each other. Therefore, it is possible not only to minimize the number of openings 16a where the pressure pipelines 17 run through the outer plate 16 of the main wing W, but also to easily secure space for lay outing the pressure pipelines 17 within the main wing W.

Although an embodiment of the present invention has been described above, the present invention can be modified in a variety of ways without departing from the subject matter of the present invention.

For example, the measurement object of the present invention is not limited to the main wing of the airplane, and the present invention is applicable to any section of any aircraft such as an airplane, a helicopter or a missile, any section of an automobile or a railcar, any section of a building, and any section of a ship including an underwater section.

Furthermore, the present invention is applicable to a model for a wind tunnel.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pressure distribution measurement system for measuring a pressure distribution on a surface of a measurement object (W) that moves relative to a fluid, the system comprising:
    a flexible sheet-form pressure detection member (11) fixed to the surface of the measurement object (W), the pressure detection member (11) having a plurality of pressure passages (11a) having lengths extending in parallel to a length of the pressure detection member (11), and a pressure detection hole (11b) opened in each of the pressure passages (11a); and
    a pressure measurement device (20),
    wherein each of the pressure passages (11a) is connected to the pressure measurement device (20) via a pressure pipeline (17).

2. The pressure distribution measurement system according to claim 1, wherein the pressure detection member (11) is extrusion-molded from a synthetic resin.

3. The pressure distribution measurement system according to claim 1, wherein the pressure distribution member is in a chord direction on an upper face on a main wing of an airplane.

4. The pressure distribution measurement system according to claim 1, wherein the pressure detection member is a narrow long band-shaped sheet that is detachably mounted to the surface by adhesive.

5. The pressure distribution measurement system according to claim 4, wherein the pressure detection member is a thin sheet having a thickness of approximately 1 mm.

6. The pressure distribution measurement system according to claim 5, wherein the pressure detection member is extrusion-molded from a synthetic resin.

7. The pressure distribution measurement system according to claim 1, wherein the plurality of pressure passages are arranged adjacent to each other in said flexible sheet-form pressure detection member and each pressure detection hole opened in each of the pressure passages is spaced along a length of said pressure detection member by a predetermined distance.

8. The pressure distribution measurement system according to claim 7, wherein the measurement object is an upper face of a main wing of an airplane and a small interval is provided between adjacent pressure detection holes in a section of a front edge of the wing and larger interval is provided between adjacent pressure detection holes in a section of a rear edge of the wing.

9. The pressure distribution measurement system according to claim 1, wherein openings at opposite ends of the pressure detection member are hermetically closed by heat welding and flattened for minimizing the influence on airflow.

10. The pressure distribution measurement system according to claim 1, wherein the measurement object is an upper face of a main wing of an airplane and a maintenance opening is formed along the width thereof whereby the pressure detection member is secured to said maintenance opening for forming a cover therefore.

11. The pressure distribution measurement system according to claim 1, wherein the pressure passages have lengths extending in parallel to a length of the pressure detection member.

12. The pressure distribution measurement system according to claim 1, wherein the surface of the measurement object is three-dimensionally curved and the flexible sheet-form pressure detection member is thin enough to conform to the three-dimensionally curved surface of the measurement object.

13. The pressure distribution measurement system according to claim 1, wherein the measurement object is a wing of an airplane and the flexible sheet-form pressure detection member is thins enough to be affixed to an upper face of the wing of the airplane along a chord line of the wing.

14. A pressure distribution measurement system for measuring a pressure distribution on a surface of a measurement object that moves relative to a fluid, the system comprising:
    a flexible sheet-form pressure detection member fixed to the surface of the measurement object;
    a plurality of pressure passages formed in the pressure detection member and extending therethrough;
    a pressure detection hole opened in each of the pressure passages; and
    a pressure measurement device;
    wherein each of the pressure passages is connected to the pressure measurement device via a pressure conduit, and
    wherein openings at opposite ends of the pressure detection member are hermetically closed by heat welding and flattened for minimizing the influence on airflow.

15. The pressure distribution measurement system according to claim 14, wherein the pressure detection member is extrusion-molded from a synthetic resin.

16. The pressure distribution measurement system according to claim 14, wherein the pressure detection member is a narrow long band-shaped sheet that is detachably mounted to the surface by adhesive.

17. The pressure distribution measurement system according to claim 16, wherein the pressure detection member is a thin sheet having a thickness of approximately 1 mm.

18. The pressure distribution measurement system according to claim 17, wherein the pressure detection member is extrusion-molded from a synthetic resin with the plurality of pressure passages being formed therein.

19. The pressure distribution measurement system according to claim 14, wherein the plurality of pressure passages are arranged adjacent to each other in said pressure detection member and each pressure detection hole opened in each of the pressure passages is spaced along a length of said pressure detection member by a predetermined distance.

20. The pressure distribution measurement system according to claim 19, wherein the measurement object is an upper face of a main wing of an airplane and a small interval is provided between adjacent pressure detection holes in a section of a front edge of the wing and larger interval is provided between adjacent pressure detection holes in a section of a rear edge of the wing.

21. The pressure distribution measurement system according to claim 14, wherein the measurement object is an upper face of a main wing of an airplane and a maintenance opening is formed along the width thereof whereby the pressure detection member is secured to said maintenance opening for forming a cover therefore.

22. The pressure distribution measurement system according to claim 14, wherein the surface of the measurement object is three-dimensionally curved and the flexible sheet-form pressure detection member is thin enough to conform to the three-dimensionally curved surface of the measurement object.

23. The pressure distribution measurement system according to claim 14, wherein the measurement object is a wing of an airplane and the flexible sheet-form pressure detection member is thin enough to be affixed to an upper face of the wing of the airplane along a chord line of the wing.

24. A pressure distribution measurement system for measuring a pressure distribution on a surface of a measurement object that moves relative to a fluid, the system comprising:
a pressure detection member fixed to the surface of the measurement object;
a plurality of pressure passages formed in the pressure detection member and extending therethrough;
a pressure detection hole opened in each of the pressure passages; and
a pressure measurement device;
wherein each of the pressure passages is connected to the pressure measurement device via a pressure conduit, wherein the pressure distribution member is in a chord direction on an upper face on a main wing of an airplane.

* * * * *